United States Patent [19]
Johansson et al.

[11] Patent Number: 5,345,483
[45] Date of Patent: Sep. 6, 1994

[54] LOWER TIE PLATE STRAINERS HAVING DOUBLE PLATE WITH OFFSET HOLES FOR BOILING WATER REACTORS

[75] Inventors: Eric B. Johansson, Wrightsville Beach; Kevin L. Ledford; Jaime A. Zuloaga, Jr., both of Wilmington, all of N.C.; David W. Danielson, Aptos, Calif.

[73] Assignee: General Electric Company, San Jose, Calif.

[21] Appl. No.: 160,721

[22] Filed: Dec. 2, 1993

[51] Int. Cl.$^5$ .................... G21C 3/30; G21C 15/00
[52] U.S. Cl. .................................. 376/313; 376/352; 376/443
[58] Field of Search ............... 376/352, 313, 443, 440, 376/462

[56] References Cited

U.S. PATENT DOCUMENTS

| | | |
|---|---|---|
| 1,240,081 | 9/1917 | Moss . |
| 1,504,233 | 8/1924 | Graham . |
| 1,992,472 | 2/1935 | Craig . |
| 3,414,474 | 12/1968 | Swanson . |
| 3,528,885 | 9/1970 | Kumpf . |
| 3,725,199 | 4/1973 | Notari et al. . |
| 3,801,453 | 4/1974 | Jones . |
| 3,840,051 | 10/1974 | Akashi et al. . |
| 3,878,870 | 4/1975 | Atherton et al. . |
| 3,879,259 | 4/1975 | Persson et al. . |
| 3,945,883 | 3/1976 | Hind et al. . |
| 3,971,698 | 7/1976 | Wolff et al. . |
| 4,032,398 | 6/1977 | Cross et al. . |
| 4,036,690 | 7/1977 | Betts et al. . |
| 4,053,358 | 10/1977 | Pennell . |
| 4,053,359 | 10/1977 | Pennell et al. . |
| 4,076,586 | 2/1978 | Bideau et al. . |
| 4,096,032 | 6/1978 | Mayers et al. . |
| 4,116,764 | 9/1978 | Jones . |
| 4,198,272 | 4/1980 | Salmon . |
| 4,412,969 | 11/1983 | Tilbrook et al. . |
| 4,420,457 | 12/1983 | Le Pargneux . |
| 4,427,624 | 1/1984 | Marlatt et al. . |

(List continued on next page.)

FOREIGN PATENT DOCUMENTS

| | | |
|---|---|---|
| 90104066.5 | 12/1990 | China . |
| 0196611 | 10/1986 | European Pat. Off. . |
| 0289829 | 11/1988 | European Pat. Off. . |
| 0311037 | 4/1989 | European Pat. Off. . |
| 0432738A1 | 6/1991 | European Pat. Off. . |
| 0432739A1 | 6/1991 | European Pat. Off. . |

(List continued on next page.)

*Primary Examiner*—Behrend E. Harvey
*Attorney, Agent, or Firm*—J. S. Beulick

[57] ABSTRACT

In a boiling water nuclear reactor fuel bundle, a debris catching arrangement is disclosed for incorporation within the flow plenum up stream or below the rod supporting grid of the lower tie plate assembly. The device is preferably placed within the lower tie plate flow plenum between the fuel bundle inlet orifice and the rod supporting grid structure supporting the fuel rods; alternate placement can include any inlet channel upstream of the fuel rods including the fuel support casting. Paired plates defining offset holes and bosses are utilized. The bosses are supported at plate webbing between the respective holes. The holes are preferably square in plan with appropriately relieved and rounded corners defining the edges of the webbing. The bosses may be cylindrical, square or rectangular in cross-section. In confrontation of plates to form the debris catching grid, each boss from one plate confronts a hole from the remaining plate. A system of edge ridges in conjunction with the bosses at each plate edge maintains the plates spatially separated with the bosses of each plate spaced from the webbing of the opposite plate. In the preferred embodiment, the plates are captured in the flow plenum of a two part tie plate. There results a three dimensional and sturdy debris catching construction which has low flow resistance through the continuum of defined flow passages while maintaining excellent debris entraining properties.

12 Claims, 14 Drawing Sheets

U.S. PATENT DOCUMENTS

| | | |
|---|---|---|
| 4,446,099 | 5/1984 | Schwind et al. . |
| 4,505,877 | 3/1985 | Rion . |
| 4,610,838 | 9/1986 | Gasparro et al. . |
| 4,614,636 | 9/1986 | Walters . |
| 4,615,862 | 10/1986 | Huckstein . |
| 4,636,525 | 1/1987 | Yant . |
| 4,652,425 | 3/1987 | Ferrari et al. . |
| 4,655,995 | 4/1987 | Freeman et al. . |
| 4,664,880 | 5/1987 | Bryan . |
| 4,678,627 | 7/1987 | Rylatt . |
| 4,684,495 | 8/1987 | Wilson et al. . |
| 4,684,496 | 8/1987 | Wilson et al. . |
| 4,716,012 | 12/1987 | Gasparro et al. . |
| 4,772,447 | 9/1988 | Manson et al. . |
| 4,781,884 | 11/1988 | Anthony . |
| 4,826,653 | 5/1989 | Nylund et al. . |
| 4,828,791 | 5/1989 | DeMario . |
| 4,832,905 | 5/1989 | Bryan et al. . |
| 4,849,161 | 7/1989 | Brown et al. . |
| 4,900,507 | 2/1990 | Shallenberger et al. . |
| 4,919,883 | 4/1990 | Bryan et al. . |
| 4,933,138 | 6/1990 | Mouesca et al. ................... 376/443 |
| 4,980,121 | 12/1990 | Roberts et al. . |
| 5,009,839 | 4/1991 | King . |
| 5,024,806 | 6/1991 | Cioffi et al. . |
| 5,024,807 | 6/1991 | Hatfield et al. . |
| 5,030,412 | 7/1991 | Yates et al. . |
| 5,037,605 | 8/1991 | Riordan, III . |
| 5,071,617 | 12/1991 | Bryan et al. . |
| 5,094,802 | 3/1992 | Riordan, III . |
| 5,100,611 | 3/1992 | Nylund . |
| 5,106,575 | 4/1992 | Nakamura et al. . |
| 5,128,096 | 7/1992 | Grattier . |
| 5,135,710 | 8/1992 | Grattier et al. . |
| 5,160,697 | 11/1992 | Verdier et al. . |
| 5,180,545 | 1/1993 | Grattier . |
| 5,219,517 | 6/1993 | Nylund . |
| 5,225,152 | 7/1993 | Verdier ................... 376/352 |
| 5,282,231 | 1/1994 | Adams et al. . |
| 5,283,812 | 2/1994 | Verdier ................... 376/352 |

FOREIGN PATENT DOCUMENTS

| | | |
|---|---|---|
| 0435744A1 | 7/1991 | European Pat. Off. . |
| 0455011A1 | 11/1991 | European Pat. Off. . |
| 0466553A1 | 1/1992 | European Pat. Off. . |
| 4006264A1 | 8/1991 | Fed. Rep. of Germany . |
| 54-19080 | 2/1979 | Japan . |
| 54-102493 | 8/1979 | Japan . |
| 54-141989 | 11/1979 | Japan . |
| 57-102215 | 6/1982 | Japan . |
| 60-162985 | 8/1985 | Japan . |
| 62-96891 | 5/1987 | Japan . |
| 63-61183 | 3/1988 | Japan . |
| 63-157093 | 6/1988 | Japan . |
| 64-39593 | 2/1989 | Japan . |
| 64-83189 | 3/1989 | Japan . |
| 3-111795 | 5/1991 | Japan . |
| 3-274491 | 12/1991 | Japan . |
| 1214998 | 12/1970 | United Kingdom . |

LOWER TIE PLATE STRAINERS HAVING DOUBLE PLATE WITH OFFSET HOLES FOR BOILING WATER REACTORS

In a boiling water nuclear reactor fuel bundle, a debris catching arrangement is disclosed for incorporation within the flow volume between the inlet nozzle and the rod supporting grid of the lower tie plate assembly. The disclosed debris catching arrangements include provision for excluding flowing debris from entrainment into the fuel rod region of the fuel bundle.

BACKGROUND OF THE INVENTION

Boiling water nuclear reactors operate for many years. Commencing with their initial construction and through their service lives, these reactors may accumulate debris in their closed circulation moderator systems. This debris can become an operating hazard if the debris is allowed to enter into the fuel bundle containing core region having the heat generating fuel rods. In order to understand this problem, a summary of reactor construction as it relates to the accumulation of debris in the core needs first to be given. Thereafter, fuel bundle construction will be set forth. Emphasis will be given to the need to preserve substantially unchanged the regions of pressure drop within the fuel bundles. Thereafter, the effects caused by debris entering into the fuel rod region of the fuel bundles will be summarized.

Boiling water nuclear reactor construction can be simply summarized for purposes of understanding the debris entrainment problem. Such nuclear reactors are provided with a large, central core. Liquid water coolant/moderator flow enters the core from the bottom and exits the core as a water steam mixture from the top.

The core includes many side-by-side fuel bundles. Water is introduced into each fuel bundle through a fuel bundle support casting from a high pressure plenum which is situated below the core. Water passes in a distributed flow through the individual fuel bundles, is heated to generate steam, and exits the upper portion of the core as a two phase water steam mixture from which the steam is extracted for the generation of energy.

The core support castings and fuel bundles are a source of pressure loss in the circulation of water through the core. This pressure loss assures the substantially even distribution of flow across the individual fuel bundles of the reactor core. When it is remembered that there are as many as 750 individual fuel bundles in a reactor core, it can be appreciated that assurance of the uniformity of flow distribution is important. To interfere with the pressure drop within the fuel bundles could affect the overall distribution of coolant/moderator within the fuel bundles of the reactor core.

Having set forth the construction of the boiling water nuclear reactor in so far as is appropriate, attention can now be directed to the construction of the fuel bundles themselves.

The fuel bundles for a boiling water nuclear reactor include a fuel rod supporting lower tie plate assembly, which lower tie plate assembly is a cast structure. The lower tie plate assembly includes at its lowest point a downward protruding bail covering an inlet nozzle. This inlet nozzle includes entry to an enlarged flow volume within the lower tie plate. At the upper end of the flow volume, there is located a rod supporting grid. Between the supporting grid and the nozzle there is defined a flow volume.

The rod supporting grid has two purposes. First, the rod supporting grid provides the mechanical support connection for the weight of the individual fuel rods to be transmitted through the entire lower tie plate to the fuel support casting. Secondly, the rod supporting grid provides a flow path for liquid water moderator into the fuel bundle for passage between the side-by-side supported fuel rods.

Above the lower tie plate, each fuel bundle includes a matrix of upstanding fuel rods—sealed tubes each containing fissionable material—which when undergoing nuclear reaction produce the power generating steam. The matrix of upstanding fuel rods includes at the upper end a so-called upper tie plate. This upper tie plate holds at least some of the fuel rods in vertical side-by-side alignment. Some of the fuel rods are attached to both the upper and lower tie plates. Usually, there are included between the upper and lower tie plates water rods for improvement of the water moderator to fuel ratio, particularly in the upper, highest void fraction region of the fuel bundle.

Fuel bundles also include about seven fuel rod spacers at varying elevations along the length of the fuel bundle. These spacers are required because the fuel rods are long (about 160 inches) and slender (about 0.4 to 0.5 inches in diameter), and would come into abrading contact under the dynamics of fluid flow and nuclear power generation within the fuel bundles. The spacers provide appropriate restraints for each fuel rod at their respective elevations and thus prevent abrading contact between the fuel rods and maintain the fuel rods at uniform spacing relative to one another along the length of the fuel bundle for optimum performance. As will hereafter be developed, these spacers are sites where debris can be trapped and damage the fuel rods.

Each fuel bundle is surrounded by a channel. This channel causes water flowing between the tie plates to be restricted to only one bundle in an isolated flow path between the tie plates. The channel also serves to separate the steam generating flow path through the fuel bundles from the surrounding core bypass region, this region being utilized for the penetration of the control rods. The water in the bypass region also provides neutron moderation.

In the operation of a boiling water nuclear reactor, it is important to understand that the maintenance of the originally designed flow distribution is important. Specifically, from the lower (high pressure) plenum inlet to the core to the outlet from the core of the steam and water mixture through the upper tie plates of the fuel bundles, about 20 pounds per square inch (psi) of pressure drop is encountered at typical 100% power/100% flow operating conditions. About 7 to 8 psi of this pressure drop occurs through the fuel support casting. This pressure drop is mainly to assure the uniform distribution of coolant/moderator flow through the many fuel bundles making up the core of the reactor and is related to the prevention of operating instabilities within the reactor at certain power rates of the reactor. At the lower tie plate of each fuel bundle, from the inlet nozzle into the flow volume and through the fuel rod supporting grid, about 1 to 1½ psi pressure drop occurs which contributes to establishing flow distribution between the individual fuel rods of each fuel bundle. Finally, through the fuel bundle itself—from the lower supporting grid to the exit at the upper tie plate—about 11 psi of pressure drop usually occurs.

When new fuel bundles are introduced into a reactor core, these pressure drops must be preserved. Otherwise, the coolant/moderator flow distribution could be compromised.

Having summarized the construction and operation of a boiling water nuclear reactor, the problem of debris resident within the closed circulation moderator system of the reactor can now be understood. Typically debris within boiling water nuclear reactors can include extraneous materials left over from reactor construction. Further, corrosion during the reactor lifetime also liberates debris. Finally, and during the numerous outages and repairs, further debris accumulates. It will therefore be understood that nuclear reactors constitute closed circulation systems that essentially accumulate debris with increasing age.

It has been discovered that a particularly vexing and usual place for the accumulation of debris is in the fuel bundles between the fuel rods particularly in the vicinity of the fuel rod spacers. It will be remembered that each fuel rod is surrounded by the spacer at the particular elevation of the spacer. Debris particles tend to lodge between the spacer structure and the fuel rods and often dynamically vibrate with the coolant/moderator flow in abrading contact to the sealed cladding of the fuel rods. Such flow induced vibration within the reactor can damage—as by fretting—as well as rupture the cladding of the fuel rods. If a sufficient number of cladding ruptures occur, plant shutdown could be necessary.

It is to be understood that modern nuclear plants have both redundancy and many safety systems designed to counteract anticipated operating casualties, such as fuel rods becoming punctured by debris. Such failures are not catastrophic. However, in almost all cases they result in the plant operating at less than optimum efficiency. Thus, it is highly desirable to reduce the incidence of debris damage to fuel rods.

It will be further understood that to a certain extent the rod supporting grid of the fuel bundle acts as a strainer. Debris exceeding the dimension of the grid cannot pass to the fuel bundles. However, it has been found that debris—especially debris with "sail areas'-'—such as metal shavings, wire and the like—work past the rod supporting grid and can become lodged between the fuel rods and spacers.

SUMMARY OF THE PRIOR ART

Prior art attempts at the placement of devices for preventing debris from entering into the regions of the fuel rods have included alteration of the grid support structure of the lower tie plate assembly. In Nvlund U.S. Pat. No. 5,100,611 issued Mar. 31, 1992, an alteration to the grid structure is disclosed. This alteration includes replacing the required through holes of the grid structure with flow channel parts that have center lines that are non-collinear. Because these flow channels are part of the fuel rod supporting grid, the size of the through holes is necessarily large to preserve the rod supporting grid strength and the area over which the holes are distributed is only co-extensive to the lower tie plate assembly at the supporting grid.

Attempts to screen debris have been made in pressurized water reactors. In Bryan U.S. Pat. No. 4,664,880 issued May 12, 1987 a wire mesh debris trap is utilized at the bottom of a pressurized water reactor fuel bundle.

In Rylatt U.S. Pat. No. 4,678,627 issued Jul. 7, 1987, this structure is modified to include a debris retaining trap. These pressurized water reactor fuel bundles constitute open structures and lack the channel confined flow path between the upper and lower tie plates common to boiling water nuclear reactors. The channel structure, required in boiling water nuclear reactor construction, is wholly absent in pressurized water reactor construction. Since flow can occur between adjacent fuel bundles in a pressurized water reactor along the entire length of the fuel bundles, the placement of the disclosed screens and traps does not occur within a confined flow path. Further, such fuel bundles lack the disclosed lower tie plate assembly utilized with boiling water reactors including the inlet nozzle, and the defined flow volume to rod supporting grid at the bottom of the fuel bundles.

In one prior art debris catching device, the lower tie plate is modified with serpentine path—almost in the form of a chevron. Overlying this construction there are placed rod supporting bars so that the weight of the rods does not crush the underlying serpentine path.

SUMMARY OF THE INVENTION

In a boiling water nuclear reactor fuel bundle, a debris catching arrangement is disclosed for incorporation within the flow plenum upstream or below the rod supporting grid of the lower tie plate assembly. The device is preferably placed within the lower tie plate flow plenum between the fuel bundle inlet orifice and the rod supporting grid structure supporting the fuel rods; alternate placement can include any inlet channel upstream of the fuel rods including the fuel support casting. Paired plates defining offset holes and bosses are utilized. The bosses are supported at plate webbing between the respective holes. The holes are preferably square in plan with appropriately relieved and rounded corners defining the edges of the webbing. In confrontation of plates to form the debris catching grid, each boss from one plate confronts a hole from the remaining plate. A system of edge ridges in conjunction with the bosses at each plate edge maintains the plates spatially separated with the bosses spaced from the webbing forming the periphery of each of the holes. In the preferred embodiment, the plates are captured in the flow plenum of a two part tie plate. There results a three dimensional and sturdy debris catching construction which has low flow resistance through the continuum of defined flow passages while maintaining excellent debris entraining properties.

BRIEF DESCRIPTION OF THE DRAWINGS

Other objects, features and advantage of this invention will become more apparent after referring to the following specification and attached drawings in which.

DESCRIPTION OF THE PREFERRED EMBODIMENT

Figure 1:
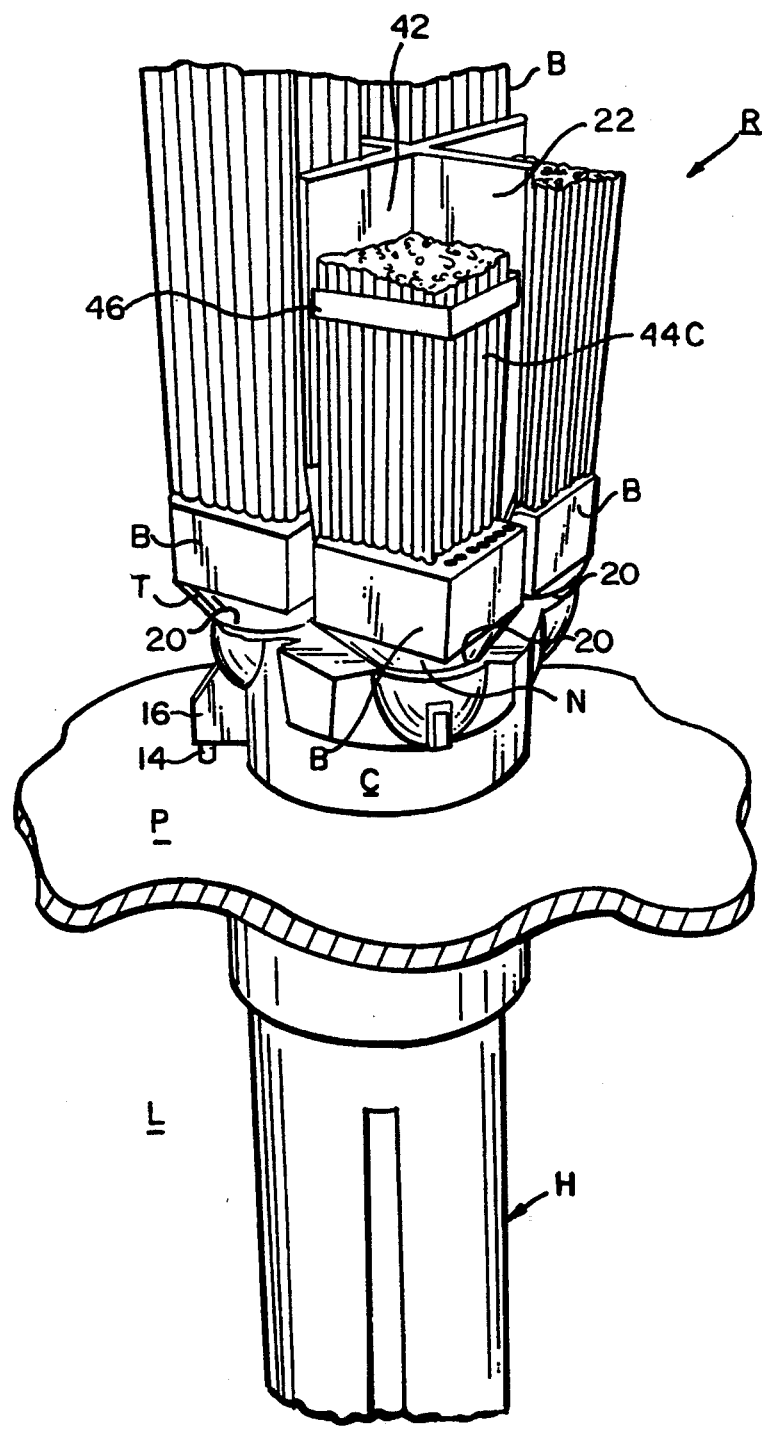
FIG. 1 is a perspective view of a portion of the lower high pressure plenum, the fuel support casting, and four supported fuel rods on the fuel support casting, thus illustrating plenums down stream of the rod supporting grid in which the strainers of this invention can be located.

Referring to FIG. 1, a pertinent detail of a portion of a reactor core is shown. Control rod drive housing H has fuel support casting C supported thereon. Fuel support casting C includes arm 16 which orients casting C with respect to pin 14 in core plate P.

Core plate P divides high pressure lower plenum L from core R, preserving the necessary pressure differential barrier to cause the controlled circulation within the many individual fuel bundles of the reactor.

Fuel support casting C includes four apertures 20 onto which four fuel bundles B at their respective lower tie plate assemblies T are placed. Each lower tie plate assembly T is disposed to cause its inlet nozzle N to communicate to one of the apertures 20 of the fuel support casting.

Fuel support casting C also includes apertures through which control rods 22 penetrate to the interstices of the four fuel bundles sitting on top of the fuel support casting C. Since the action of the control rods is not important with respect to this invention, further discussion of this aspect of the reactor will not be included.

Remembering that only four out of a possible 750 fuel bundles are illustrated, it will be understood that the pressure drop across core plate P is important. Accordingly, a review of the pressure drop within a boiling water nuclear reactor can be instructive.

First, and through an orifice (not shown) in the fuel support casting C, an approximate 7 to 8 psi pressure drop occurs at typical 100% power/100% flow operating conditions. This pressure drop is utilized to ensure uniform distribution of bundle coolant flow through the many (up to 750) fuel bundles within a boiling water nuclear reactor.

Second, and in the lower tie plate of the fuel bundles on each fuel support casting C, approximately 1½ psi of pressure drop occurs. This pressure drop is a result primarily of the change in flow velocity occurring through this complex geometry structure.

Finally, and as the coolant rises and generates steam within the fuel bundle, approximately 10 to 12 psi of pressure drop is incurred. This pressure drop is distributed throughout the length of the fuel bundle—and is important to the operating stability of both the individual fuel bundles and the collective fuel bundles constituting the core of the nuclear reactor.

The reader should understand that the summary of pressure drop given above is an oversimplification. This is a very complex part of the design and operation of a nuclear reactor. Having said this much, one point must be stressed. Pressure drop within the individual fuel bundles of a boiling water reactor must remain substantially unchanged. Accordingly, if apparatus for preventing debris entrainment into the fuel bundles is going to be utilized, appreciable change in overall fuel bundle pressure drop should be avoided.

Having carefully reviewed the requirements for the avoidance of increased pressure drop in debris restricting devices, several further comments can be made.

First, any debris catching arrangement should be sufficiently rigid so that the excluding apparatus does not under any circumstance break apart, fail to stop debris, and become the source of further debris itself. For this reason, wire screens are not used. Instead, perforated metal is in all cases utilized in the examples that follow.

Second, we have found that it is desirable to restrict pressure drop to a minimum. This can be done by making the velocity of flow through the apertures themselves as low as feasible. A second reason for this limitation is the entrainment of the debris in the flow. Assuming entrainment of debris in the flow, if any possible angle of attack can be realized that will enable debris to pass through an aperture, given sufficient time, passage through the aperture will eventually occur. By maintaining slow velocity at the respective apertures, entrainment of debris is less likely to occur.

Third, we find that modification of the rod supporting grid—a technique utilized in the prior art—is not satisfactory. Specifically, we prefer to use straining apertures that are as small as possible—down to a dimension of 0.050 of an inch diameter. Unfortunately, the rod supporting grid is a member that must have the required static and dynamic properties to support the fuel rods under all conceivable conditions. Utilizing a matrix of such holes in the rod supporting grid at the pitches required for low pressure drop in the lower tie plate is not practicable. First, since the small apertures would be confined to the plane of the rod supporting grid, a total reduction of flow area will be present that would lead both to unacceptable pressure drop as well as high flow velocities through the individual holes in the rod supporting grid. Further, such a matrix of small apertures in the rod supporting grid would reduce the strength of the grid to a level below that required for support of the fuel rods.

We have identified the so-called flow volume of the lower tie plate assembly as a primary candidate for the location of debris rejection apparatus. In boiling water nuclear reactor fuel bundles at the lower tie plate assembly, there is defined between the nozzle at the lower end and the fuel rod supporting grid at the upper end, a relatively large flow volume. This flow volume is sufficiently large to accommodate a three dimensional structure—with one side of the three dimension structure communicated to the nozzle inlet and the other side of the three dimensional structure communicated to the rod supporting grid. At the same time, periphery of the three dimensional supporting structure can be attached to the sides of the lower tie plate assembly—so that all fluids passing through the flow volume of the lower tie plate simply must pass through the restricting apertures of the perforated plate. Only small modification to the lower tie plate assembly is required.

Having set forth these considerations, attention can be directed to the embodiments of the invention.

Figure 2:
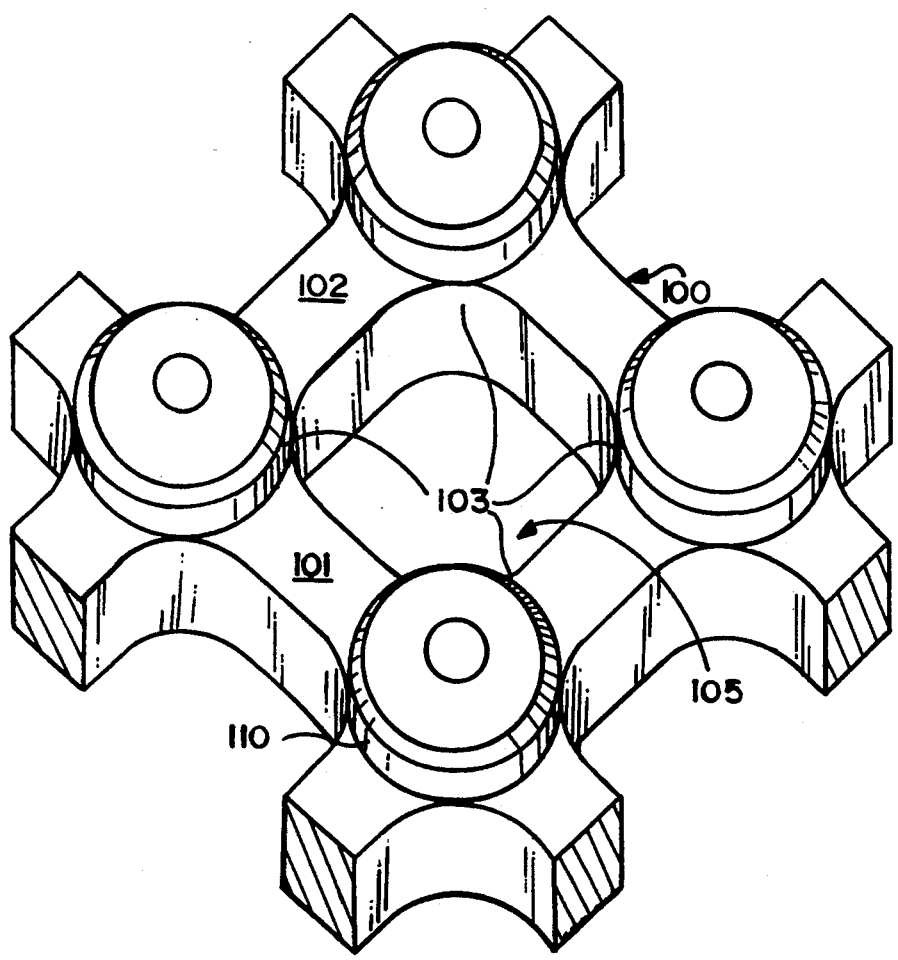
FIG. 2 is a three dimensional view of a portion of a single plate.
Figure 3A:
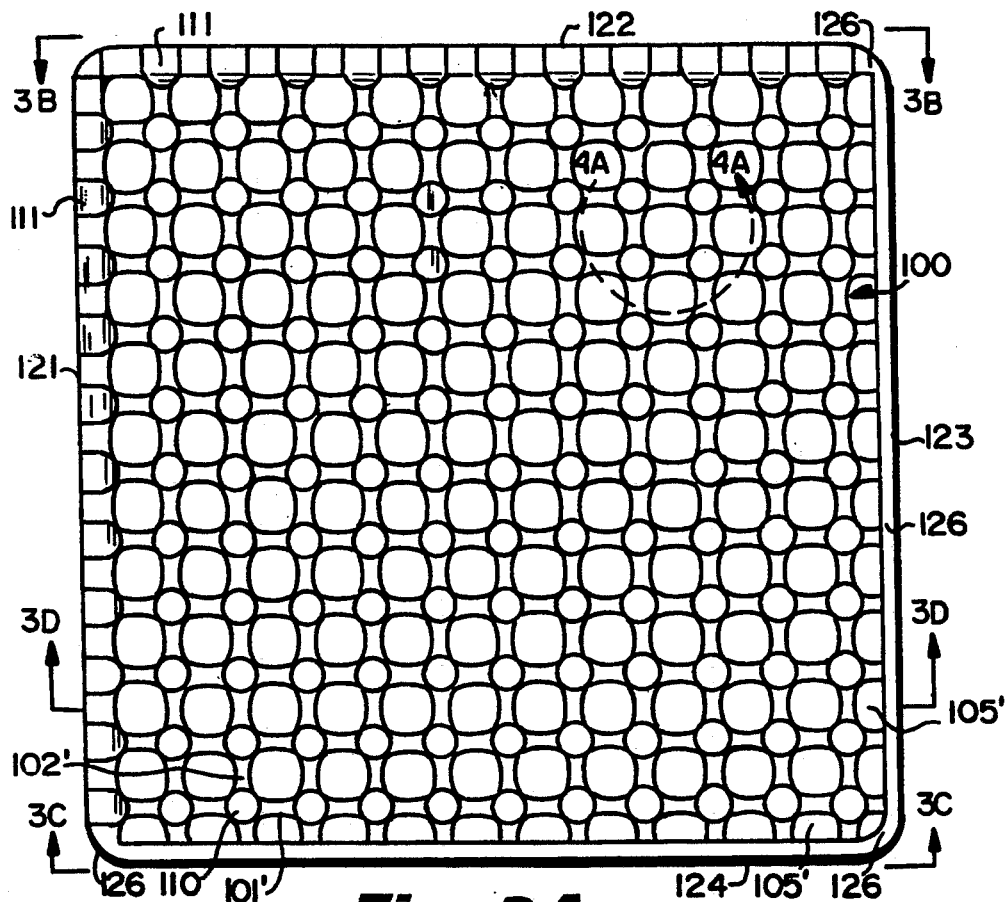
FIGS. 3A, 3B, 3C, and 3D are respective plan views, two edge cross sections, and an intermediate cross section setting forth the construction of a single plate.
Figure 3B:
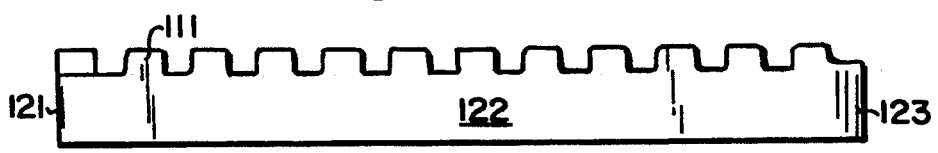
Figure 3C:
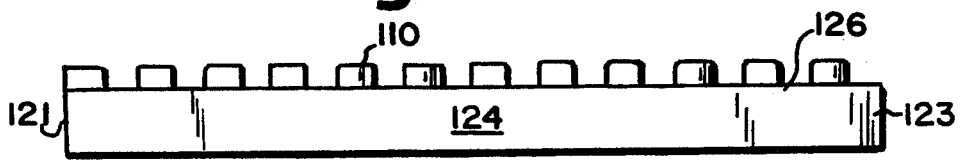
Figure 3D:
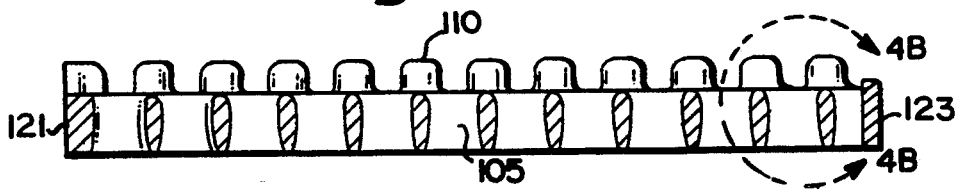

Referring to FIG. 2, the basic plate of this invention is illustrated. Specifically, grid 100 is formed with right angled members 101 and 102 defining a central aperture 105. Central aperture 105 includes rounded corners 103.

At the intersections of right angled grid members 101 and 102, rounded bosses 110 are supported. As can be seen, the grid 100 is at one level on the plate; the rounded bosses 110 are at a separate level immediately above grid 100.

Referring to FIGS. 3A-3D, a plate construction modified from that previously illustrated in FIG. 2 is shown. In this construction, the grid members 101' and 102' are given a streamlined section to facilitate the flow. These sections 101' and 102' extend between the protruding bosses 110.

It will become apparent from reading the following description that the plates are configured to confront one another. This being the case, the height and offset of the plates at the respective boundaries needs to be examined.

Specifically, sides 121 and 122 incorporate partial bosses 111. This feature is illustrated in the side elevation section of FIG. 3B. Further sides 123 and 124 have an extended height wall 126. Wall 126 is positioned on two adjacent sides and runs medially of apertures 105' defined by adjacent sides 123 and 124.

Figure 4A:
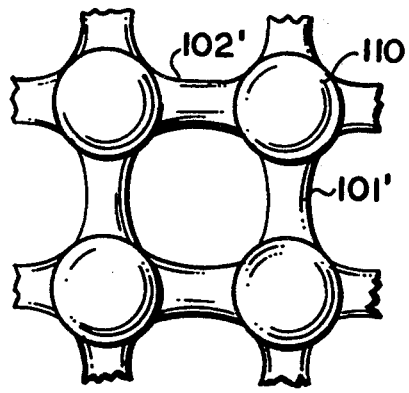
FIGS. 4A and 4B are a respective plan view and cross section illustrating details of the plate channels and rounded projections or bosses.
Figure 4B:
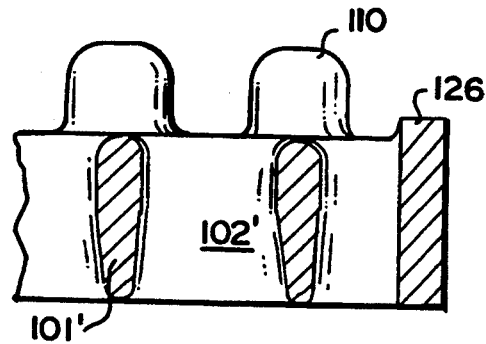

FIGS. 4A and 4B illustrate the grid construction on an expanded scale. The streamlined shape of the grid members 101' is shown in FIG. 4B.

Figure 5A:
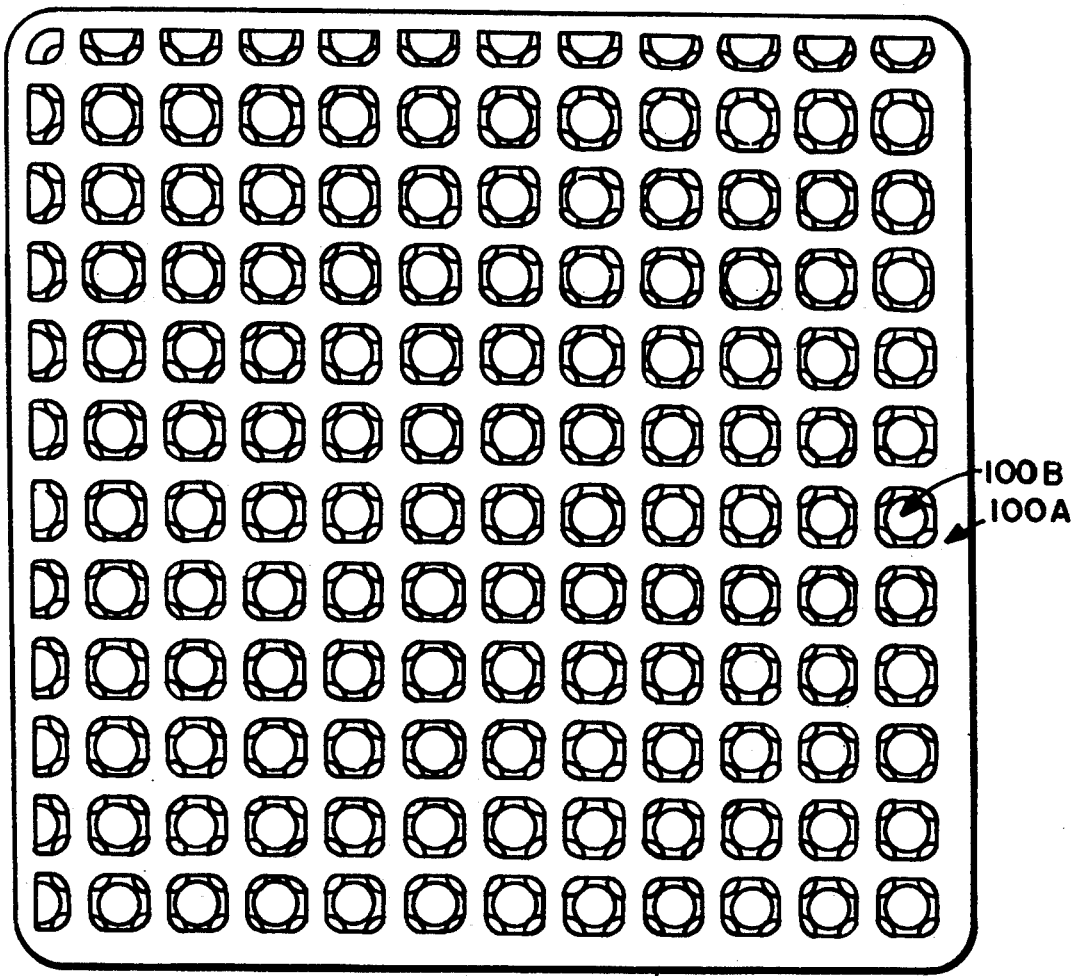
FIGS. 5A and 5B are respective plan views and side elevation sections of two plates in confronted relation for furnishing together the debris catching construction of this invention.
Figure 5B:
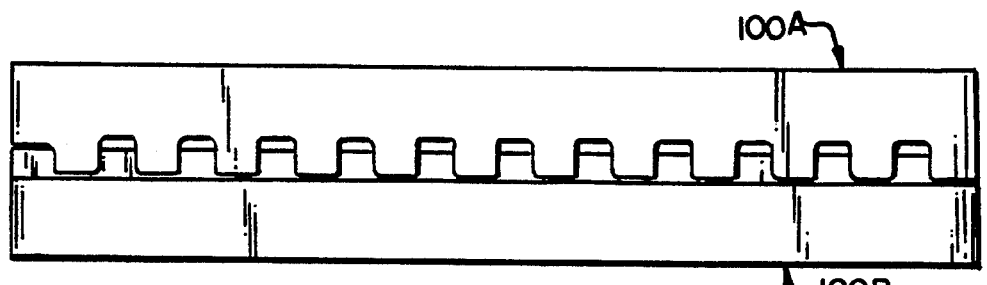

FIGS. 5A and 5B illustrate two of the identically constructed plates 100A and 100B confronted. Together, these plates define the filter matrix. Some attention can be given to how this confrontation occurs.

Referring back to FIG. 3A, it will be understood that sides 121 and 122 of plate 100A fit over and confront sides 123 and 124 of plate 100B. Likewise, sides 123 and 124 of plate 100A fit over and confront sides 121 and 122 of plate 100B.

Two main effects of this confrontation result. First, the plates are evenly spaced one from another. Specifically walls 126 along sides 123 and 124 confront the partial bosses 111 at sides 121 and 122. This occurs from both plates. Consequently, the plates are evenly spaced apart.

Second, the bosses 110 of one plate—say plate 100A—are offset as to register with openings 105 in the remaining plate—say plate 100B. Thus, a strainer structure is defined by the confronted plates.

Figure 8A:
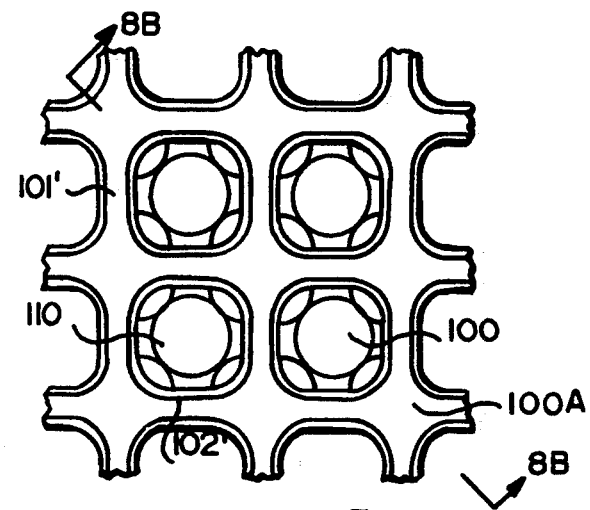
FIGS. 8A and 8B are respective plan views and diagonal cross sections taken through the confronted plates illustrating in the case of FIG. 8B the trapping of debris within the filter.
Figure 8B:
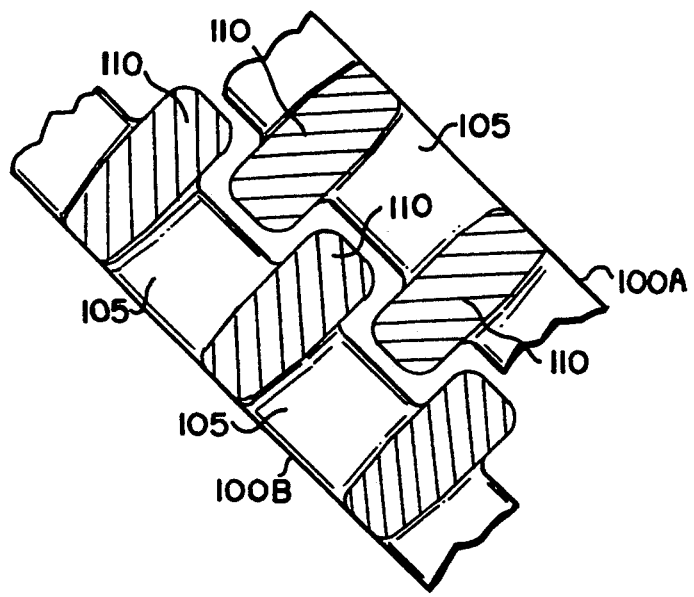

Further, and within the side walls of the confronted plates—it will be found that the defined strainer structure includes no continuous ridges defined between the material of the two plates 100A and 100B. This can clearly be seen in FIGS. 8A and 8B at the illustrated bosses 110. The bosses 110 do not penetrate into the apertures 105.

The fact that the plates inside of the respective sides 121—124 never contact one another is best illustrated in the progressive cross sectional views of FIG. 6 and FIGS. 7A-7G.

Figure 7D:
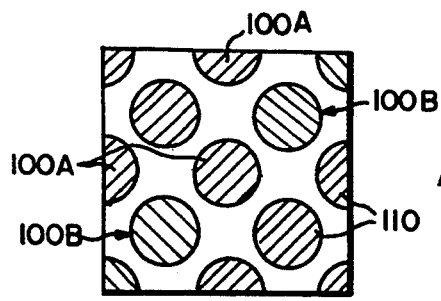
FIGS. 7A-7G are the sections of the confronted plates taken at the corresponding elevations illustrated in FIG. 6.
Figure 7C:
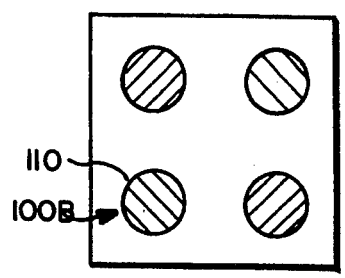
Figure 7G:
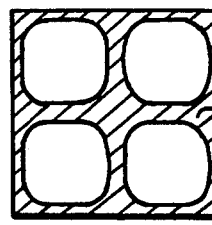
Figure 7B:
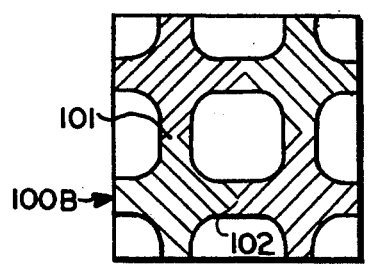
Figure 7F:
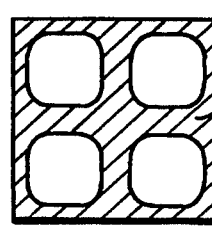
Figure 7A:
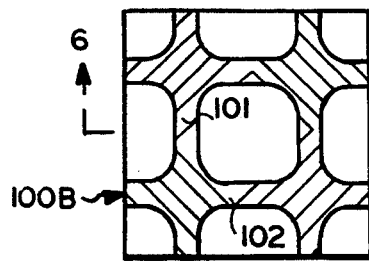
Figure 7E:
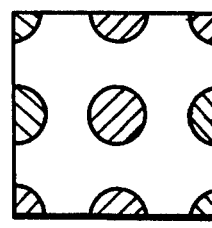

Referring to these progressive cross sectional views, respective cross sections of FIGS. 7A-7C illustrate plate 100B. Further, the respective sections of FIGS. 7E-7G illustrate plate 100A. It is only the cross section of FIG. 7D that shows both plates—and this display of both plates occurs at bosses 110 only. However, it is to be noted that the bosses are nowhere in direct contact with one another.

The construction described above provides a filter which will prevent the passage of small debris while introducing only a small additional pressure drop to the coolant flow. The way in which the invention accomplishes this can be understood by first considering a pair of plates with offset holes and no bosses.

Figure 9:
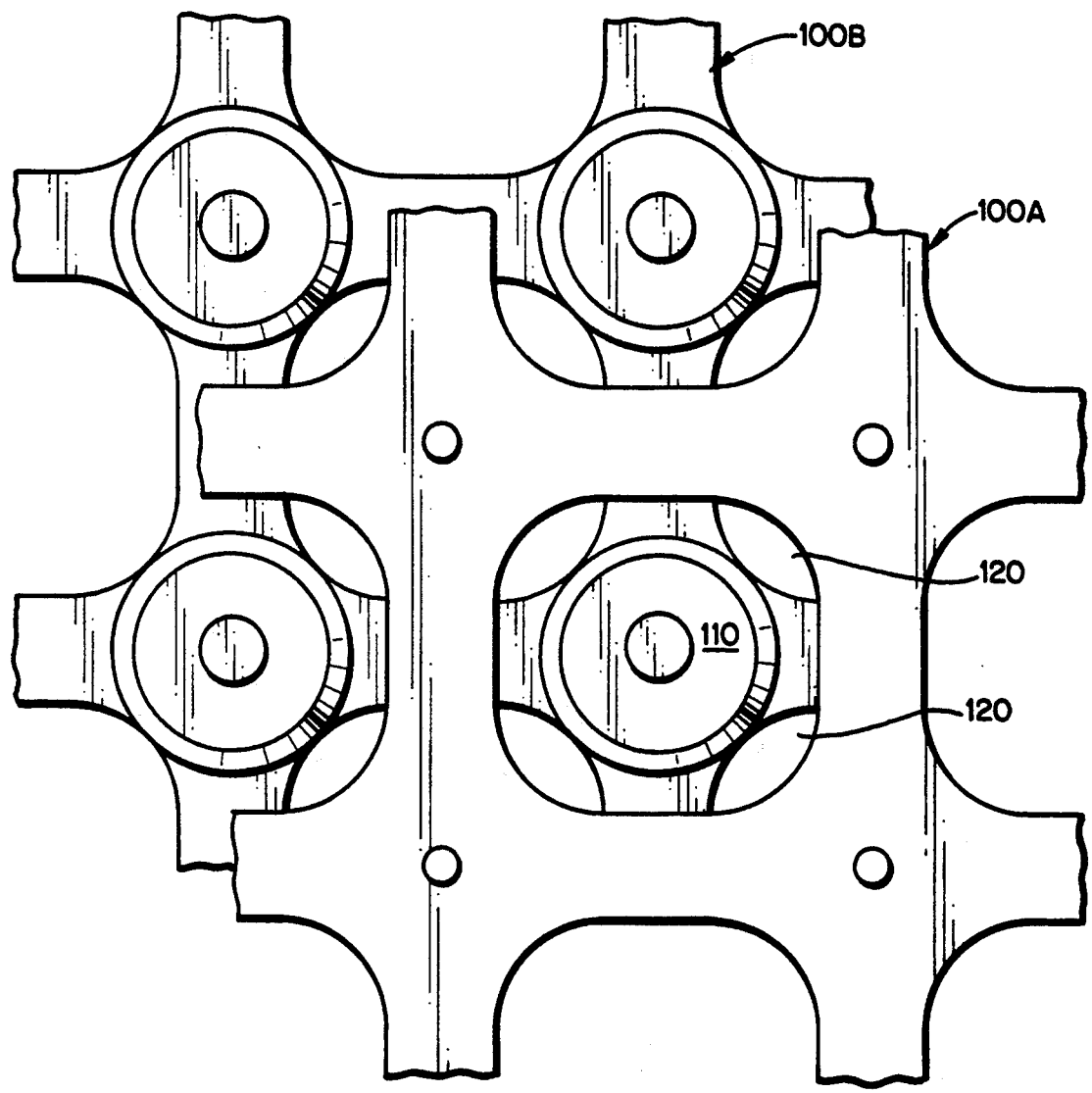
FIG. 9 is a top view of a portion of the confronted plates.

FIG. 9 shows a top view of a pair of plates with offset holes. These plates are identical to those of FIGS. 4 and 5A except that there are no bosses. Debris can pass through regions 120 in a straight through pass. These regions can be made very small; however larger objects can pass through at an angle from the normal to the plate surface.

Figure 10:
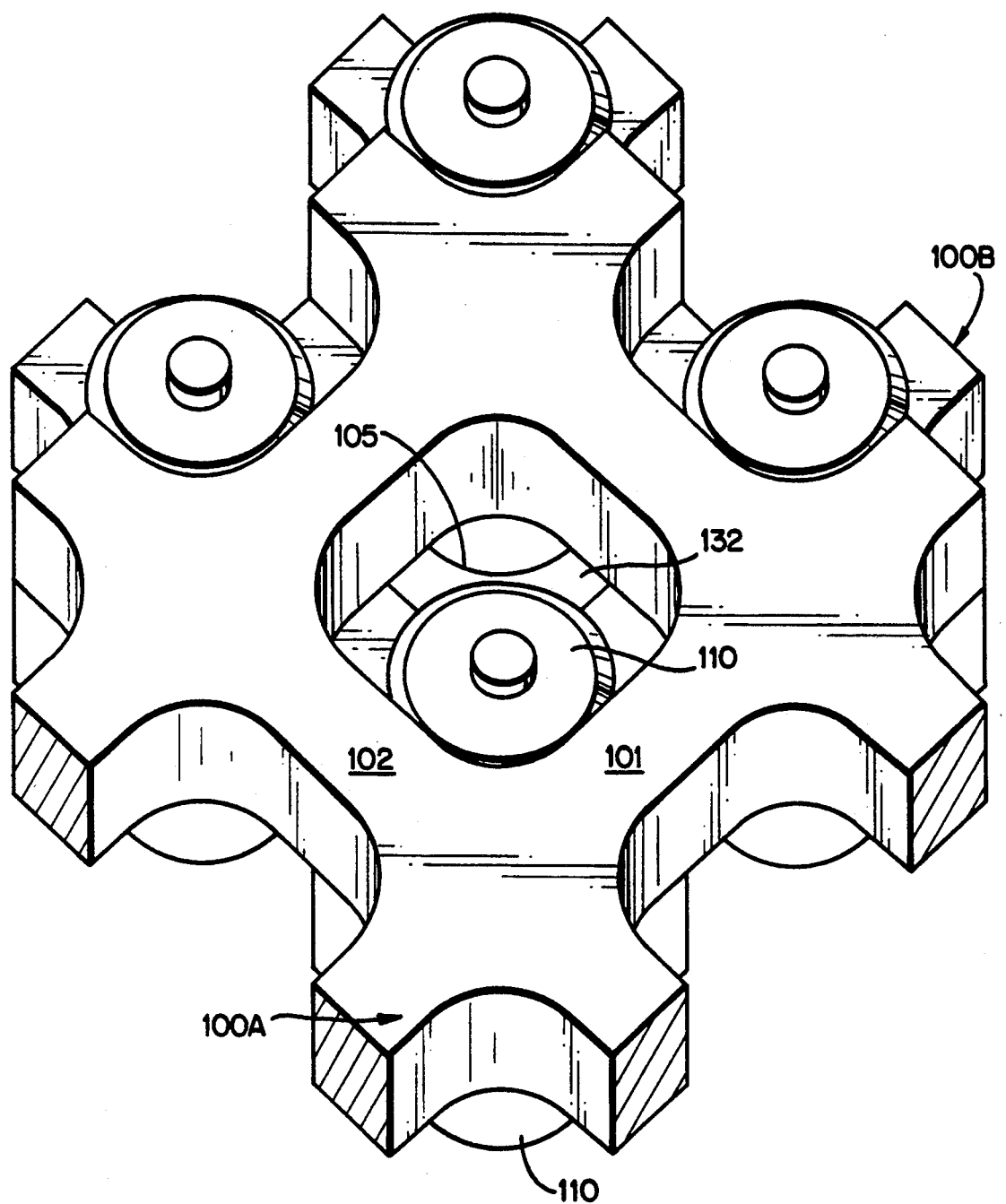
FIG. 10 is a perspective view of a portion of the confronted plates illustrating the clearances present between the plates for the trapping of debris.

FIG. 10 shows an oblique view of the plate pair. The area 132 for passage of debris is partially blocked by the bosses 110. Without the bosses, this passage area would be much larger than the area 120 in the top view of FIG. 9.

Returning to consideration of the plate pair without bosses, the ability to stop debris can be improved by reducing the spacing between plates. However, tests have shown that the pressure loss becomes very large. The coolant flow must make sharp turns to go from the holes of the first plate to the holes of the second plate, and vortices and eddies occur.

In the present invention the plates can be separated, and the bosses ensure a smooth flow path while preventing the passage of debris. The flow is illustrated in FIGS. 7A-7E. It can be seen that there are no abrupt changes in flow area or flow direction as the coolant passes through the plates.

Figure 11:
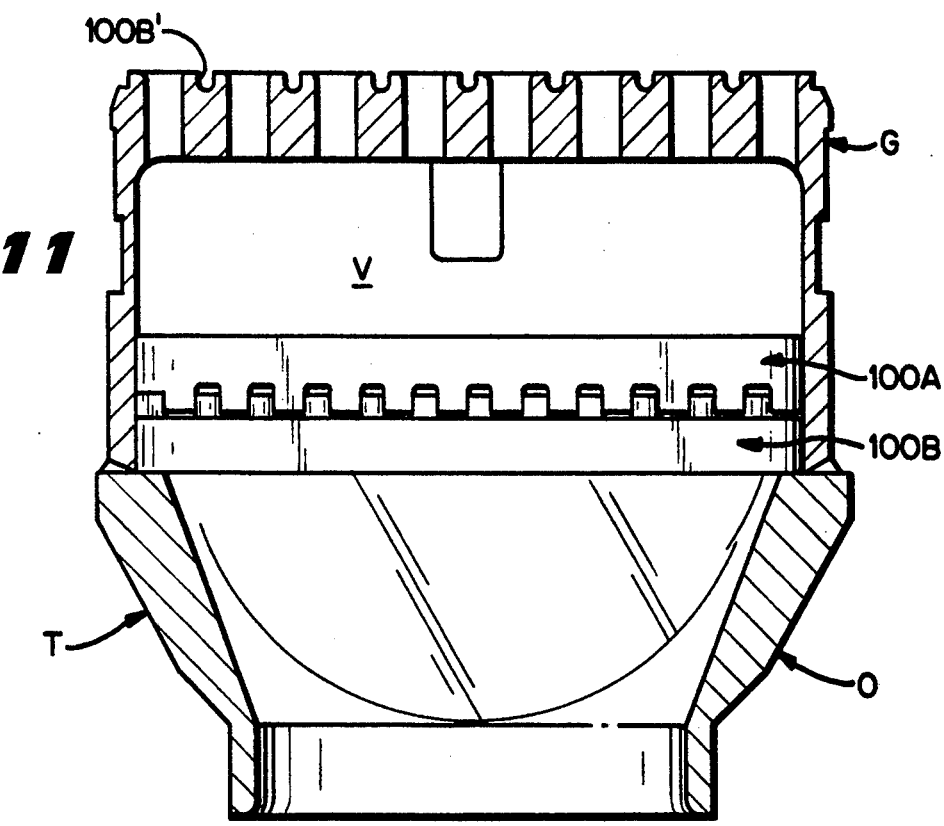
FIG. 11 illustrates a bifurcated lower tie plate for the trapping of the plates.

It will be understood that the confronted plates are designed to be trapped within a lower tie plate T at flow volume V. Referring to FIG. 11, rod supporting grid section G is show over an orifice section 0 of lower tie plate T. Fastening of the two sections one to another occurs by welding. It will be seen that respective plates 100A and 100B are trapped within flow volume V to provide the filtering of this invention.

Figure 12:
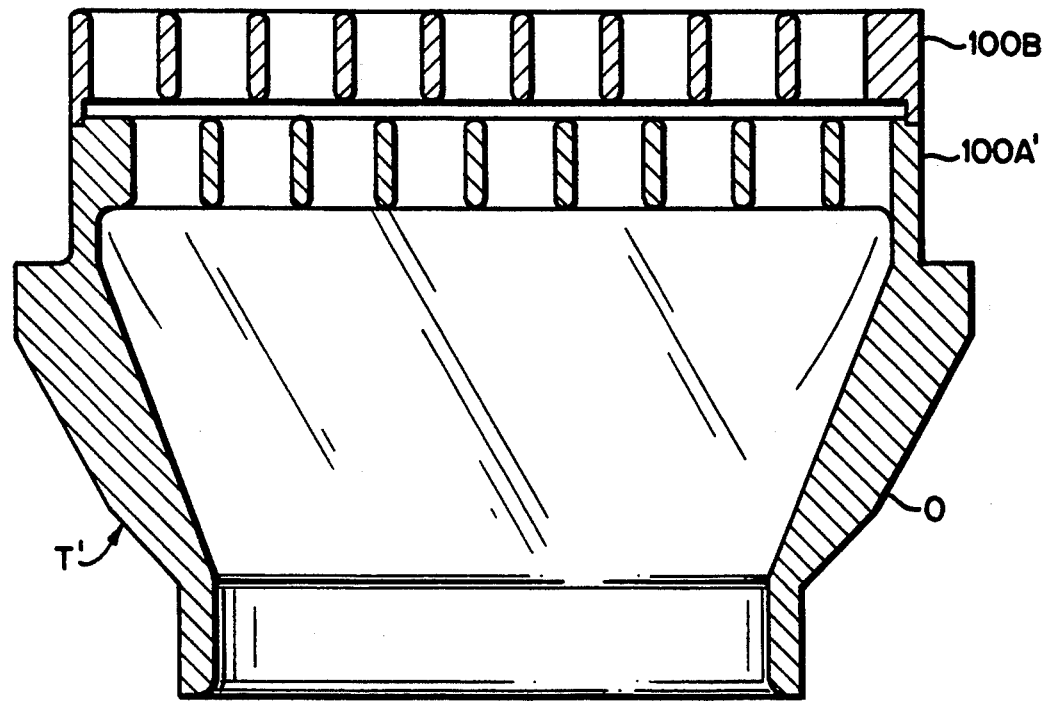
FIG. 12 illustrates one of the tie plates incorporated into the lower tie plate shroud with a plate having offset and overlying hole mounted over the incorporated plate.

An alternate method for incorporating the filter in the lower tie plate is shown in FIG. 12. Specifically, orifice section 0 of lower tie plate T' has grid 100A integrally constructed with the grid. Plate 100B fits overlying this integrally constructed grid. The assembly is completed by welding a rod supporting grid section G (See FIG. 11) overlying the confronted plates.

The strainer described above has a very low pressure loss. The debris blocking capability can be improved with a small increase in pressure loss, and some increase in complexity.

Figure 13:
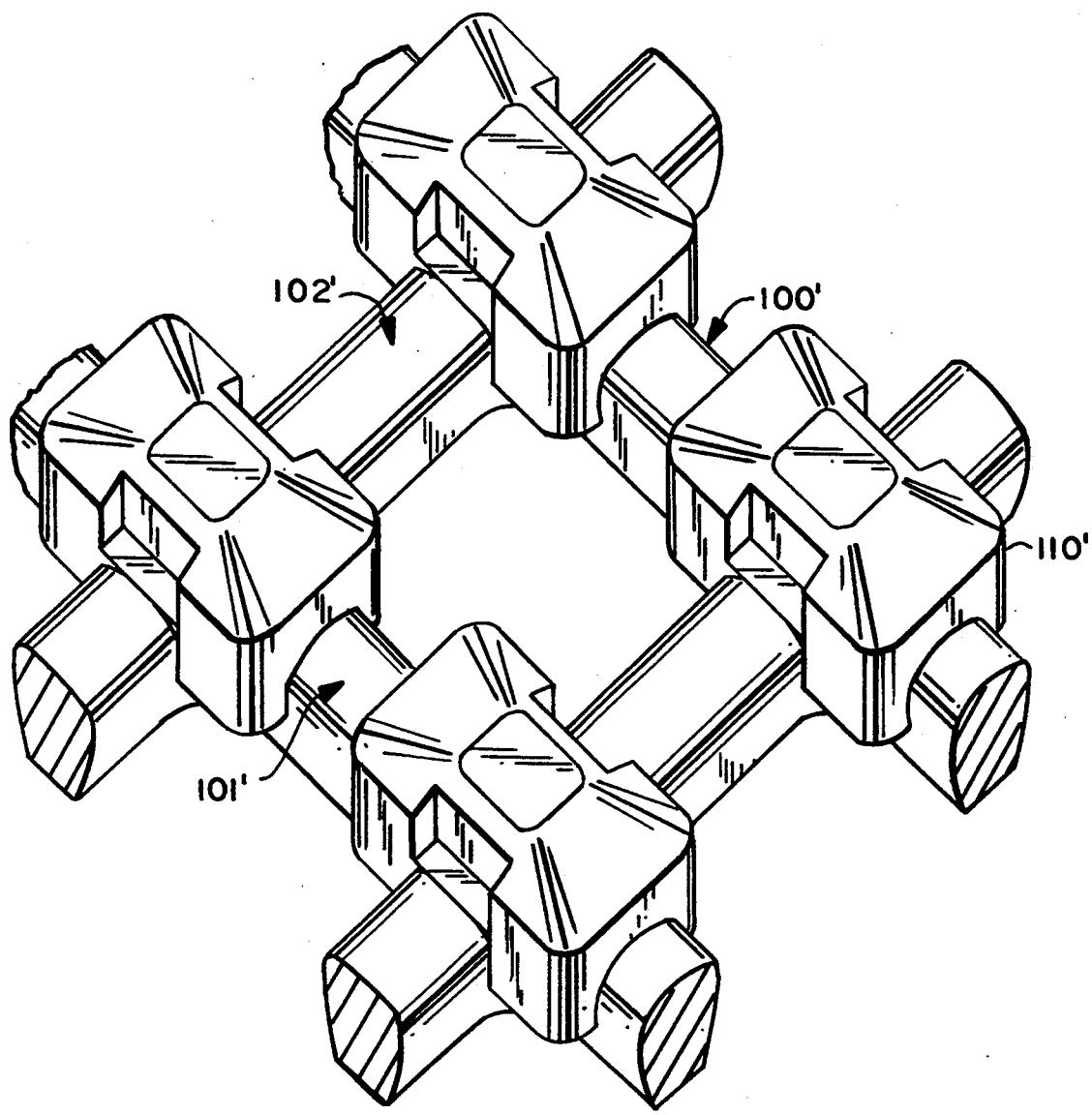
FIG. 13 is a perspective view of a portion of one plate of an alternate embodiment.
Figure 14A:
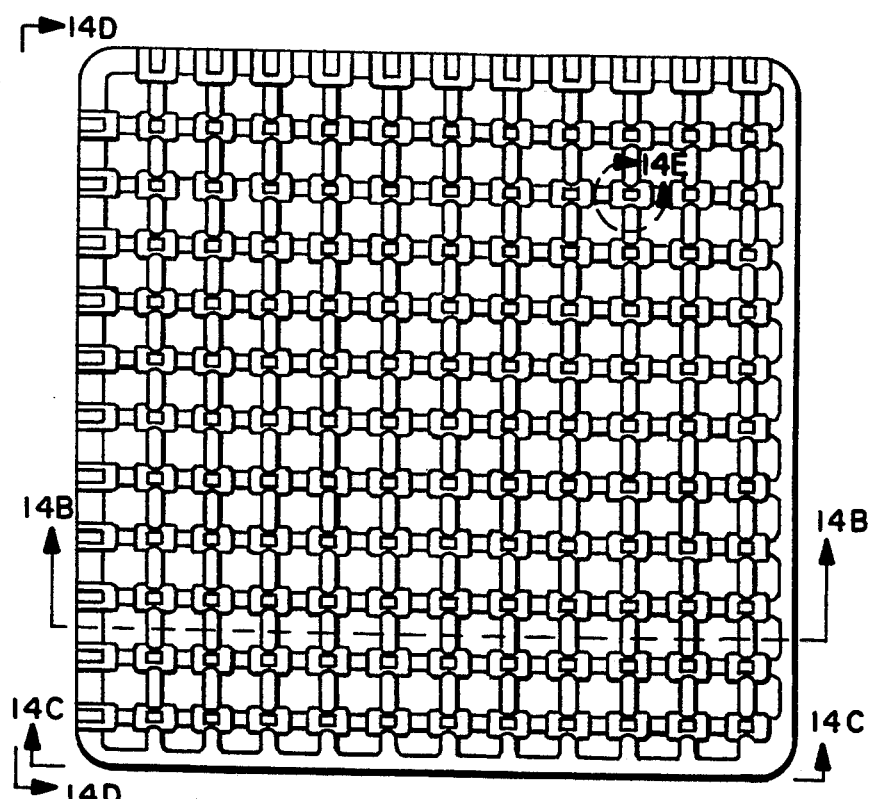
FIGS. 14A-14E are respective plan views, two edge views, an edge cross section and an enlarged view of one plate of the alternate embodiment.
Figure 14B:
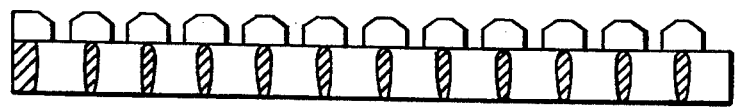
Figure 14C:
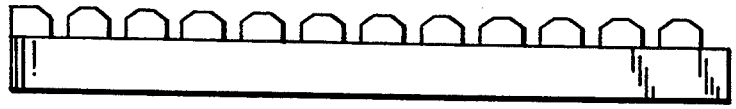
Figure 14D:
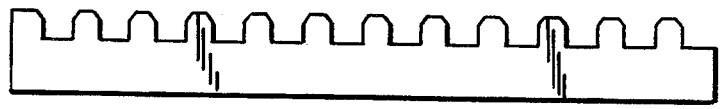
Figure 14E:
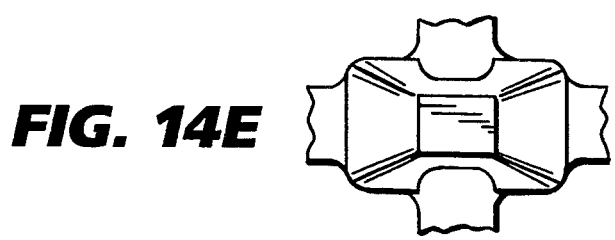

FIG. 13 shows a portion of the grid 100' and bosses 110', one plate of an alternate embodiment. Instead of circular bosses, slightly larger rectangular bosses are used.

FIGS. 14A–14E are respective plan views, interior cross section, two edge views, and an enlarged view of a rectangular boss. In this embodiment, no edge rail is used. Two edges of the plate have bosses and the other two edges do not.

Figure 15A:
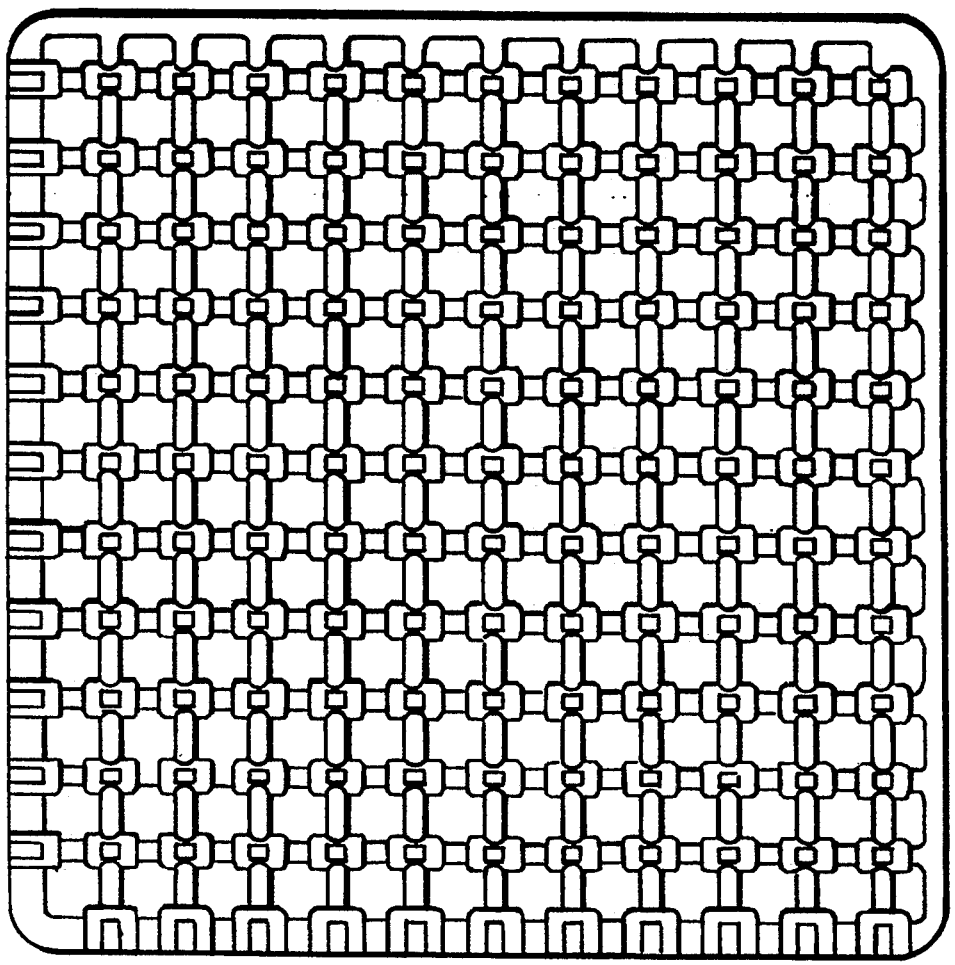
FIGS. 15A and 15B are respective plan and edge views of the second plate of the alternate embodiment.
Figure 15B:
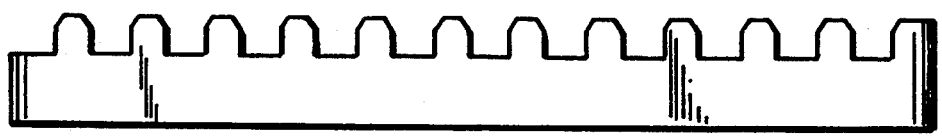
Figure 16:
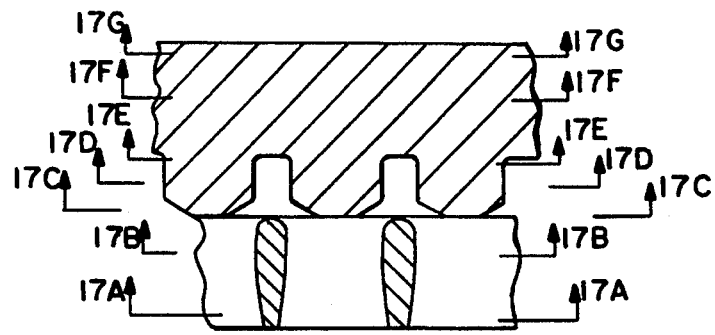
FIG. 16 is a section taken through a detail of one of the confronted plates of FIGS. 14A and 15A, illustrating the plan cross sections taken at various elevations through the confronted plates.
Figure 17D:
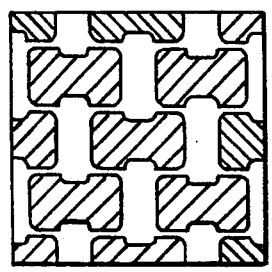
FIGS. 17A-17G are the sections of the confronted plates taken at the elevations shown in FIG. 16; and, FIG. 18 shows a perspective view of a portion of the confronted plates.
Figure 17G:
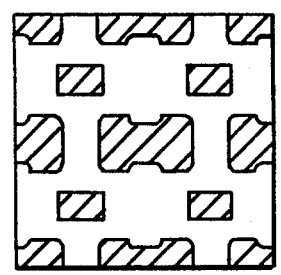
Figure 17:
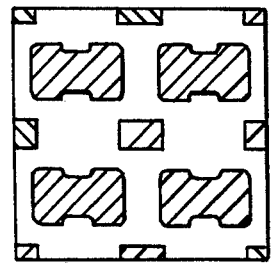
Figure 17F:
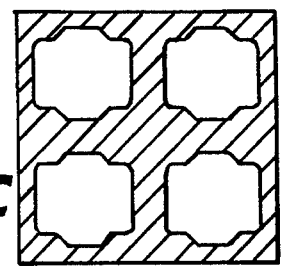
Figure 17B:
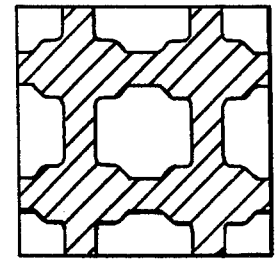
Figure 17E:
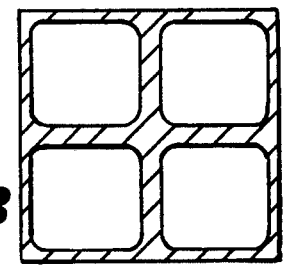
Figure 17A:
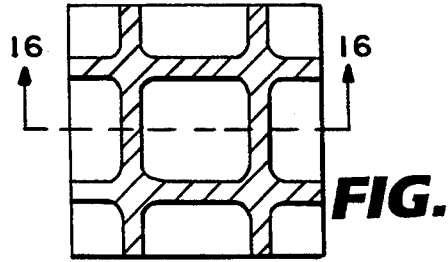

Because of the rectangular bosses, some symmetry is lost, and it is not possible to use two identical plates. FIGS. 15A and 15B show a plan view and an edge view, respectively, of the second plate of the plate pair. Again, two edges have bosses and two edges do not. The edges are located so that when the second plate is inverted, the edges with bosses of one plate will be of the edges without bosses of the second plate. The location of the bosses on the second plate are displaced relative to those of the first so that the bosses of one plate are opposite the openings in the other plate.

Figure 6:
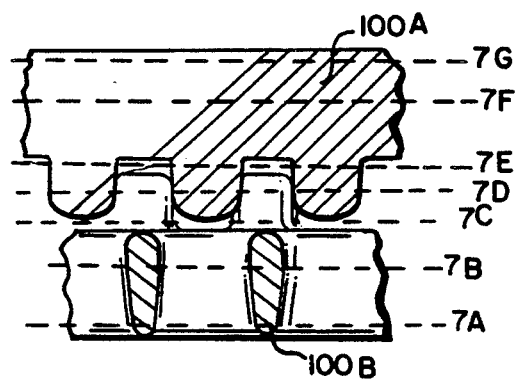
FIG. 6 is a section taken through a detail of the confronted plates of FIGS. 5A and 5B illustrating the plan cross sections taken at various elevations through the confronted plates.

FIGS. 16 and 17A–17G illustrate progressive cross sectional view, showing how the flow area changes as the coolant moves upward through the two plates. Comparison of FIG. 15 with FIG. 6 shows that the tops of the bosses of the top plate have moved closer to the top of the ligaments of the bottom plate, but still do not penetrate into the apertures. Similarly, the tops of the bosses of the lower plate are level with the bottom of the ligaments of the upper plate. This shift in boss position restricts the size of debris which can get through the two plates. The shift in position occurs because sides do not have an extended height.

Figure 18:
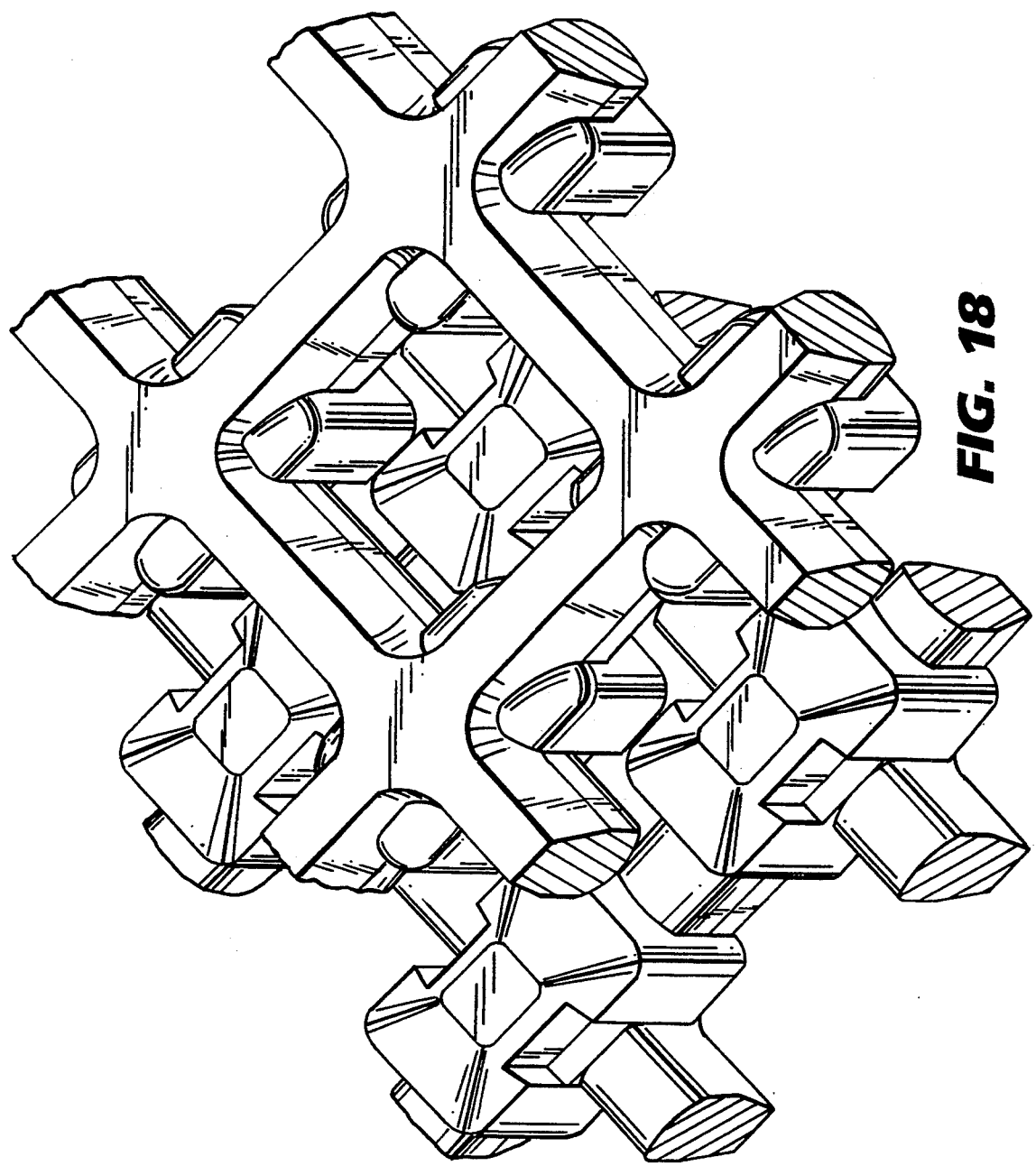

FIG. 18 shows a portion of the second embodiment of the two plate filter. This is a top view, a small angle from the vertical. Comparing FIG. 18 to FIG. 10, the line-of-sight opening has been reduced by use of the rectangular bosses.

It will be understood that an unusually sturdy strainer grid assembly is illustrated. Further, and because of the spaced apart central construction, local obstructions due to gathered debris will always have and maintain immediately surrounding paths for the passage of fluid. A strainer structure which is highly resistant to complete flow blockage—either locally or overall is disclosed.

What is claimed is:

1. In a boiling water reactor fuel bundle, a debris catching grid construction for placement within the flow volume defined by the lower tie plate assembly between the inlet nozzle and upper fuel rod supporting grid comprising:

a pair of plates, each having a substantially rectangular array of holes and bosses, said holes defined by peripheral webbing with said peripheral webbing supporting said bosses, said plates arranged in confronting relationship such that the bosses of each plate project toward the confronting plate;

said holes having a first dimension from two adjacent sides of said plate and having a second and differing dimension from two remaining sides of said plate for centering said webbing supported bosses of one of said plates with said webbing surrounded holes of the other of said plates;

ridge means on at least two of said sides of each plate for confronting portions of said other plate for maintaining said plates at said bosses and webbing in spaced apart relation when said plates are confronted; and means for supporting said plates in the flow plenum of a lower tie plate whereby said plates define a debris restraining interface having a continuous of flow passages with low pressure drop.

2. In a boiling water reactor fuel bundle, a debris catching grid construction for placement within the flow volume defined by the lower tie plate assembly according to claim 1 wherein:

said holes are square in section and rounded at said corners.

3. In a boiling water reactor fuel bundle, a debris catching grid construction for placement within the flow volume defined by the lower tie plate assembly according to claim 1 wherein:

said bosses are truncated cylindrical protrusions from a side of said webbing opposite said holes.

4. In a boiling water reactor fuel bundle, a debris catching grid construction for placement within the flow volume defined by the lower tie plate assembly according to claim 1 wherein:

said bosses are truncated rectangular protrusions from a side of said webbing opposite said holes.

5. In a boiling water reactor fuel bundle, a debris catching grid construction for placement within the flow volume defined by the lower tie plate assembly according to claim 1 wherein:

said ridges are defined on adjacent sides of said plate.

6. In a boiling water reactor fuel bundle, a debris catching grid construction for placement within the flow volume defined by the lower tie plate assembly according to claim 1 wherein:

said webbing has a streamlined configuration.

7. In a boiling water reactor fuel handle, comprising in combination:

a lower tie plate assembly including a fuel rod supporting grid, an inlet nozzle, and sidewall extending between said nozzle to the edges of said grid to define therebetween a flow volume interior of said tie plate;

a plurality of upstanding fuel rods, said fuel rods supported on said rod supporting grid and extending in upstanding vertical side-by-side relation;

an upper tie plate for supporting at least some of fuel rods and providing connection to said lower tie plate through at least some of said fuel rods;

a pair of plates, each having a substantially rectangular array of holes and bosses said holes defined by peripheral webbing with said peripheral webbing supporting said bosses, said plates arranged in confronting relationship such that the bosses of each plate project toward the confronting plate;

said holes having a first dimension from two adjacent sides of said plate and having a second and differing dimension from two remaining sides of said plate for centering said webbing supported bosses of one of said plates with said webbing surrounded holes of the other of said plates;

ridge means on at least two of said sides of each plate for confronting portions of said other plate for maintaining said plates at said bosses and webbing in spaced apart relation when said plates are confronted; and means for mounting said three dimensional perforated plate construction interiorly of the flow volume of said lower tie plate.

8. In a boiling water reactor fuel bundle, a debris catching grid construction for placement within the flow volume defined by the lower tie plate assembly according to claim 7 wherein:

said holes are square in section and rounded at said corners.

9. In a boiling water reactor fuel bundle, a debris catching grid construction for placement within the flow volume defined by the lower tie plate assembly according to claim 7 wherein:

said bosses are truncated cylindrical protrusions from a side of said webbing opposite said holes.

10. In a boiling water reactor fuel bundle, a debris catching grid construction for placement within the flow volume defined by the lower tie plate assembly according to claim 7 wherein:

said bosses are truncated rectangular protrusions from a side of said webbing opposite said holes.

11. In a boiling water reactor fuel bundle, a debris catching grid construction for placement within the flow volume defined by the lower tie plate assembly according to claim 7 wherein:

said ridges are defined on adjacent sides of said plate.

12. In a boiling water reactor fuel bundle, a debris catching grid construction for placement within the flow volume defined by the lower tie plate assembly according to claim 7 wherein:

said webbing has a streamlined configuration.

* * * * *